F. L. FULLER.
CASH REGISTER.
APPLICATION FILED MAR. 6, 1918.

1,369,415.

Patented Feb. 22, 1921.
5 SHEETS—SHEET 1.

Inventor
FREDERICK L. FULLER
Carl Benst
Attorney

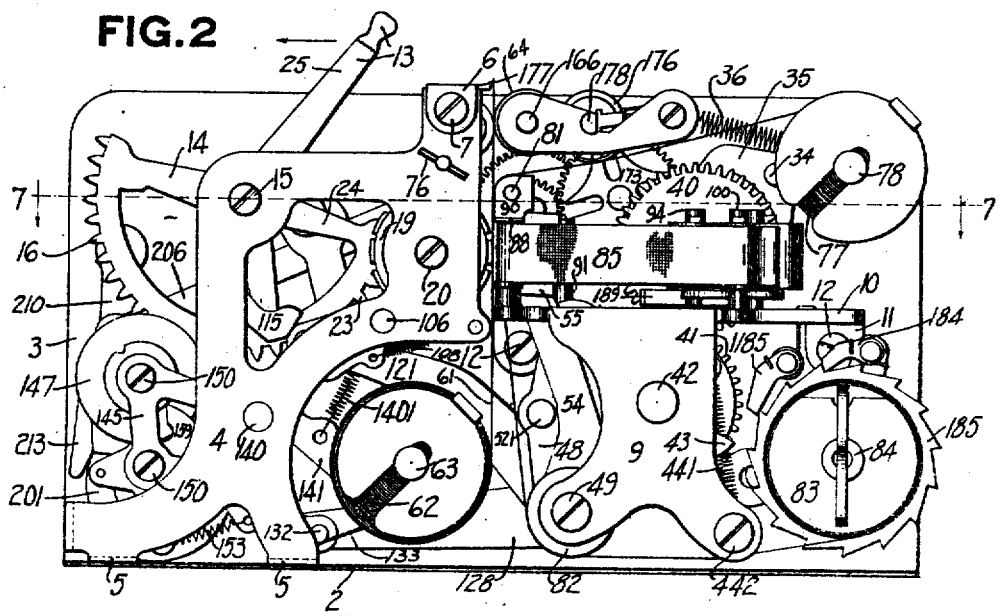

F. L. FULLER.
CASH REGISTER.
APPLICATION FILED MAR. 6, 1918.

1,369,415.

Patented Feb. 22, 1921.
5 SHEETS—SHEET 3.

Inventor
FREDERICK L. FULLER

Karl Beust
Attorney

F. L. FULLER.
CASH REGISTER.
APPLICATION FILED MAR. 6, 1918.

1,369,415.

Patented Feb. 22, 1921.
5 SHEETS—SHEET 4.

Inventor
FREDERICK L. FULLER

Attorney

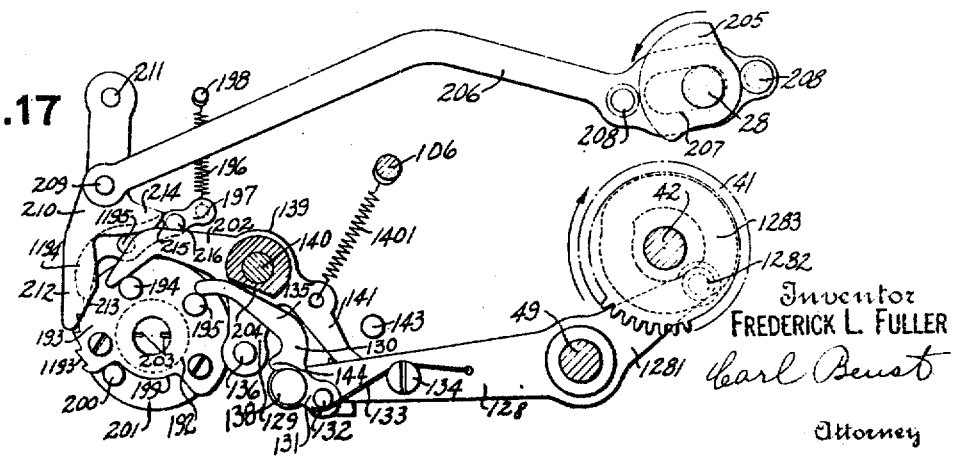

UNITED STATES PATENT OFFICE.

FREDERICK L. FULLER, OF BRIDGEPORT, CONNECTICUT, ASSIGNOR TO THE NATIONAL CASH REGISTER COMPANY, OF DAYTON, OHIO.

CASH-REGISTER.

1,369,415.

Specification of Letters Patent.   Patented Feb. 22, 1921.

Application filed March 6, 1918. Serial No. 220,752.

*To all whom it may concern:*

Be it known that I, FREDERICK L. FULLER, a citizen of the United States, residing at Bridgeport, in the county of Fairfield and State of Connecticut, have invented certain new and useful Improvements in Cash-Registers, of which I declare the following to be a full, clear, and exact description.

This invention relates to improvements in cash registers, the primary object being to devise such a mechanism which is adapted to be transported from place to place by the operator.

The present machine is designed to register amounts and issue checks printed commensurate with these amounts, the checks being issued as receipts, and is small enough to be readily carried in a case having a supporting strap slung over the shoulder of the operator.

The register is provided with a detail strip and due to its portable capability is well adapted for use by ice, milk, newspaper, gas and electricity bill collectors and in fact by collectors of all sorts since the machine is a safeguard for the employer of the collector due to the printed record and also for the payer furnishing him with a receipt.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:

Fig. 2 is a side elevation of the registering mechanism, the casing therefor being removed.

Fig. 3 is a vertical sectional view, parts shown in elevation, taken on the line 3—3 of Fig. 6 and looking in the direction of the arrows.

Fig. 11 is a detail view of one of the checks issued by the register.

Fig. 12 is a detail view of a portion of the detail strip.

Fig. 13 is a detail view of the tension and trip mechanism for the platen.

Fig. 14 is a detail view of the operating levers and cams for returning the differential segments to zero and operating the feed for the detail strip.

Fig. 15 is a detail view of the lock, key and mechanism operated thereby for causing a total to be taken by the register.

Fig. 16 is a fragmentary detail view in top plan showing the elements controlled by the lock and key for taking a total.

Fig. 17 is a detail view, partly in section, showing in side elevation the elements illustrated in Fig. 16.

Figure 1:
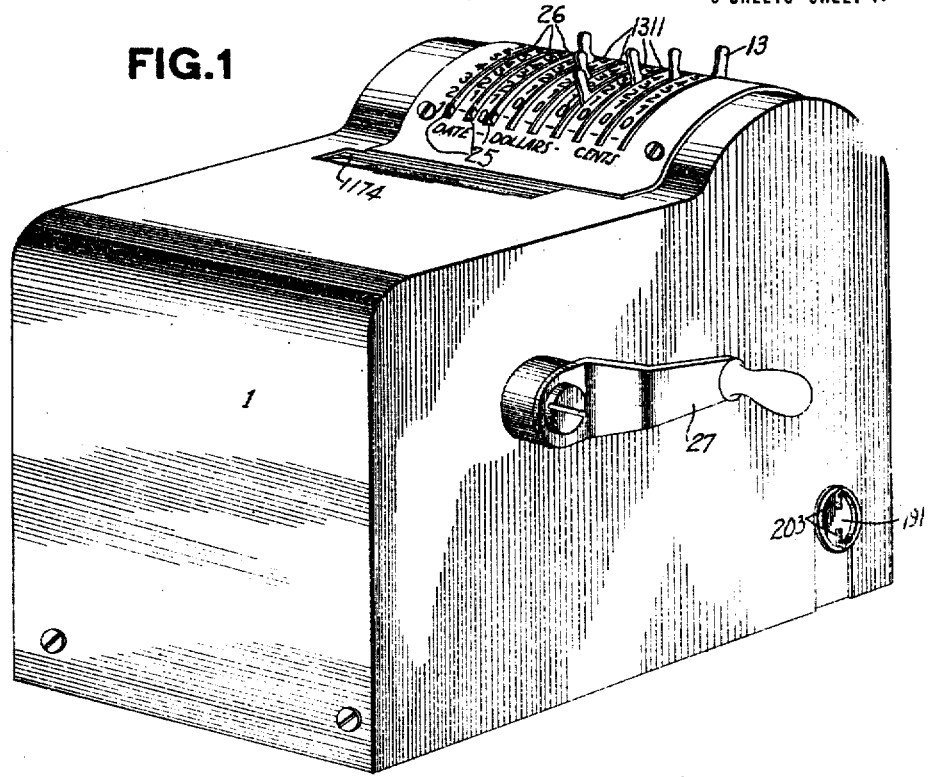
Figure 1 is a perspective view of the register.

Referring now to the drawings in detail in which like reference numerals designate similar parts throughout the various figures, it will be seen that the operating elements for the register are inclosed by a suitable cabinet or casing 1. By referring to Figs. 2, 3, 4, 5, 6 and 7 it will be seen that all of the operating elements of the mechanism are supported within a framework consisting of a horizontal wall 2, vertical wall 3 and vertically extending bracket 4 secured to the wall 2 at the points 5 and tied to the vertical wall 3 by a brace 6 secured to the bracket by a screw 7 and to the wall 3 by a screw 8. The framework also comprises an L shaped bracket 9, the horizontal leg 10 of which is provided with a plurality of vertically extending ears 11 which are secured to the vertical wall 3 by means of screws 12.

Broadly speaking the mechanism comprises type setting means, a totalizer, paper feeds, a ribbon, a spring actuated platen and a crank handle which provides means for operating the totalizer, taking an impression and returning the type setting segments to normal position.

The elements of the mechanism will now be described in detail, the description of each element being taken up in the order, as far as possible, in which it performs its sequence of operation in the functions of the register. In the operation of the machine the operator first sets the various type wheels, which is accomplished by means of operating levers 13 which project outside the cabinet 1 through slots 1311 on the spaces between which are inscribed integers 9 to 0 and also dashes. These integers represent various units of a monetary system. The levers 13 are moved along in the slots in the direction of the arrow until they are opposite the desired integers at which time the associated type wheels have correspondingly been set, the setting being accomplished by means of a segment 14 secured to each handle 13 and loosely mounted upon a horizontally disposed shaft 15 secured at one end to the wall 3 and at its other end to the bracket 4. One portion of the segment is provided with teeth 16 which coöperate with the totalizer, hereafter to be described, and another portion of the segment with teeth 17 which are in constant mesh with pinions 18, see Fig. 4. secured to the sides of type wheels 19 which are rotatably mounted upon a horizontally disposed shaft 20 secured at one end in the wall 3 and at its other in the bracket 4. The type wheels 19, above described, contain type representing numerals from 1 to 9 and 0 and a dash, which characters correspond with the characters inscribed on the space between the slots 1311 of the casing 1. Three date printing type wheels 21 (Fig. 7) are also revolubly mounted upon the shaft 20 having secured thereto pinions 22 which are in constant mesh with the gear teeth 23 of segments 24 (Fig. 3) loosely mounted upon the shaft 15 and having integral therewith operating levers 25 extending through slots 26 made in the casing 1, the spaces between the slots being inscribed with characters representing the various months and days of the month.

After the type wheels have been set by the operating handles all the rest of the functions of the machine are occasioned by turning a crank handle 27 one revolution. This handle is pinned to a shaft 28, referring to Figs. 5, 7 and 10, revolubly supported at one end in the vertically extending bracket 29 having a horizontally extending ear 30 secured to the horizontal leg 10 of the L shaped bracket 9. A latch and full stroke device is provided for the shaft 28 which provides means for normally locking the crank handle 27 at the completion of one revolution of the handle and also means for preventing a reversal of the crank handle after it has once been released and turned to actuate the elements of the register. This device, referring to Fig. 10, comprises a snailed cam 31 fast upon the shaft 28 and provided with fine ratchet teeth 32 on its periphery. Coöperating with the cam 31 is a pallet 33 pivotally mounted upon a stud 34 secured to the wall 3 of the framework. The pallet 33 has one nose 35 in position to engage the fine teeth 32 of the cam 31 and held in engagement with the said teeth by means of a coiled spring 36. The pallet 33 is also provided with a downwardly extending arm 37 offset sufficiently to permit a notch 38 made in the lower end thereof to coöperate with a pin 39 extending out from the face of the cam 31 adjacent the wall 3 of the framework. The rotation of the shaft 28, carrying the cam 31 with it, in the direction indicated by the arrow, will rock the arm 37 of the pallet 33 toward and away from the periphery of the cam 31, the nose 35 of the said pallet riding over the ratchet teeth 32. As the nose 35 reaches the last tooth on the cam, the notch 38 of the lever 37 will be rocked toward the periphery of the cam a distance sufficient to be engaged by and lock the pin 39 carried thereby. In this way the rotation of the shaft 28 through the crank handle 27 is limited and also the said shaft locked at the end of one complete revolution. When it is desired to release the handle 28 a slight pressure is exerted to move the handle 27 counter-clockwise which, due to the tangential shape of the notch 38, will release the pin 39 from the notch 38 and permit the nose 35 of the pallet 33 to be brought downward into engagement with the teeth 32 of the cam 31 under the action of the spring 36. The crank handle 27 may now be revolved, but when it has once started and the cam 31 revolved thereby, the said handle may not be reversed due to the engagement of the nose 35 of the pallet 33 with the ratchet teeth 32 on the periphery of the cam. From the foregoing it will be apparent that the pallet 33 not only serves as the locking pawl, as is common in such constructions, but also serves as the pawl for coöperating with the full stroke mechanism. Due to this construction, the operation to release the handle 27, simultaneously causes the setting of the full stroke mechanism.

Figure 4:
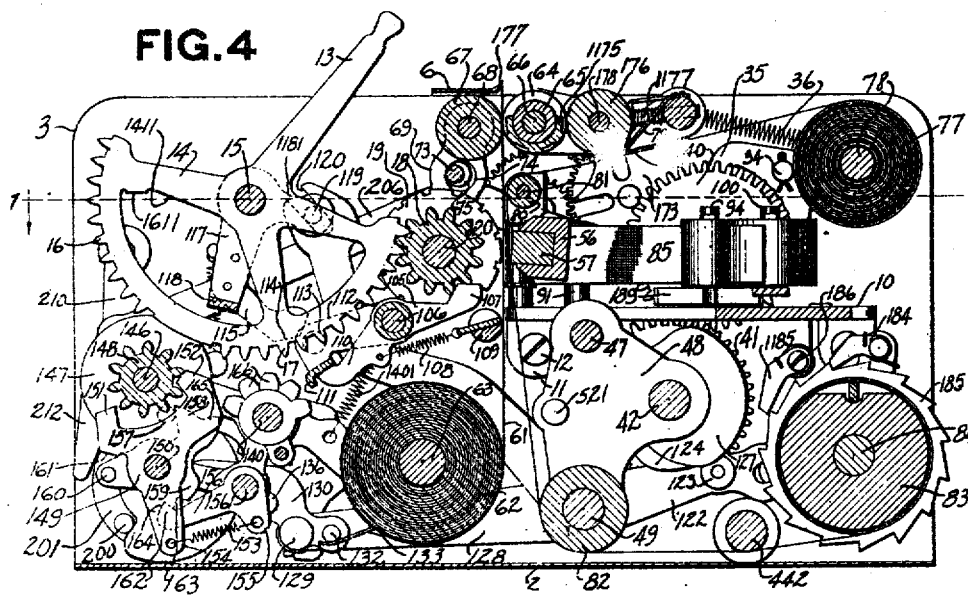
Fig. 4 is a vertical sectional view, parts shown in elevation, taken on the line 4—4 of Fig. 6 and looking in the direction of the arrows.

After the crank handle has been released the first function caused by its actuation is the taking of an impression from the set type wheels 19. The rotation of the shaft 28 by the handle 27, referring to Figs. 3 and 13, revolves a gear 40 pinned to the said shaft which gear meshes with a gear 41 fast upon a shaft 42 revolubly mounted in bearings formed in the vertical wall 3 of the framework and the vertical wall of the bracket 9. Pinned to the shaft 42 is a snail cam 43. A forked lever 46 is rotatably mounted upon a stud shaft 47 secured at one end to the vertical wall 3 of the framework and at its other end to a bracket 48. The bracket 48, see Fig. 4, is supported upon the shaft 42 and upon a shaft 49 which in turn is secured at one end to the wall 3 of the framework and at its other end to the vertical leg of the L shaped bracket 9. One arm 50 of the forked lever 46 is provided with a nose 51 coöperating with a pin 52 secured upon the adjacent face of one arm 54 of a bell crank lever 53 loosely mounted upon the shaft 49. A spring 441 strained between a stud 44 carried by the outer end of the other arm 45 of the forked lever 46 and a brace rod 442, normally holds the nose 51 against the pin 52. The said arm 54 has its upper end bent at right angles to form a flange 55 to which is secured a platen supporting block 56 within which a resilient platen 57 is secured. The other arm 58 of the bell crank 53 carries on its outer end a pin 59 having a flat side 60. The operation of the parts just described is as follows: The snail cam 43 is rotated clockwise (Fig. 3) by the crank handle 27 through the gears 41 and 40, and, engaging with the pin 59 carried by the lever 58 of the bell crank 53 will rock the arm 54 clockwise. The clockwise movement of the arm 54 will, through the medium of the pin 52 and nose 51 of the arm 50, rock the other arm 45 of the lever 46 counter-clockwise and put the spring 441 under tension. When the cam 43 has been rotated sufficiently to position the highest point of its periphery above the flat side 60 of the pin 59, at which time the platen 57 has been moved clockwise away from the type wheels 19, the further movement of the cam will free the said pin, permitting the arm 54 to be rocked counter-clockwise, see Fig. 3, under the influence of the forked lever 45 which engages the pin 52 with one arm 50, and is rocked downwardly by the spring 441 attached to its opposite arm 45. The tension put upon the spring 441 is sufficient, upon the release of the lever 54, to force the platen 57 against the type wheels 19 with considerable force, the length of its impression movement being limited by a pin 521 carried by the bracket 48 engaging the arm 54.

The actuation of the platen 57, above described, causes two impressions to be made, one upon a check strip and the other upon a detail strip.

Figure 6:
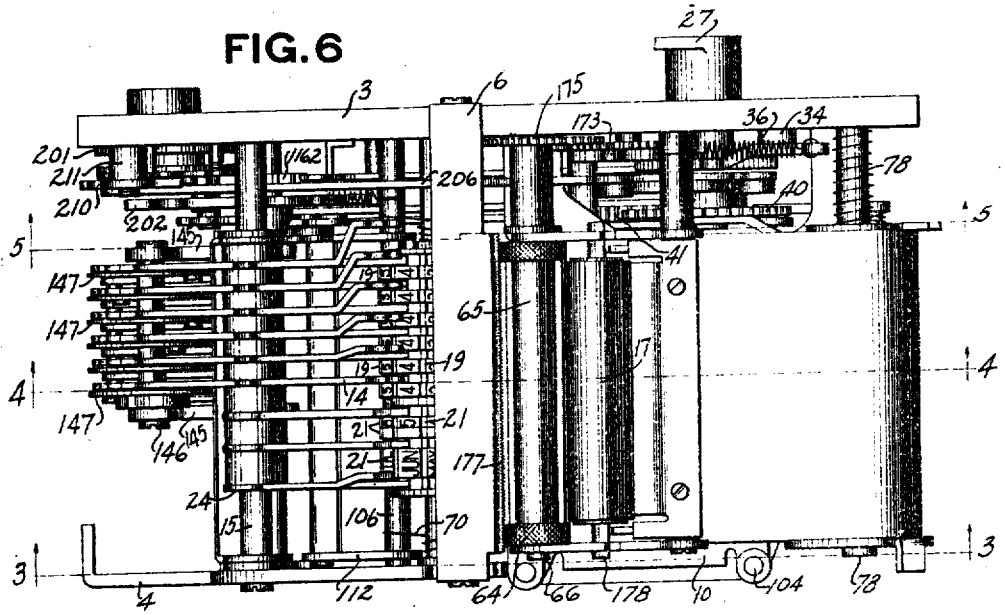
Fig. 6 is a top plan view of the registering mechanism with the cabinet or inclosing case therefor removed.

The check strip 61 is fed from a storage roll 62 rotatably mounted upon a shaft 63 carried by the vertical wall 3 of the framework, vertically upwardly between feed rollers 64, referring to Figs. 2, 4 and 6, carried by each end of a sleeve 65, loosely mounted upon a shaft 66 and a resilient roller 67 loosely mounted upon a shaft 68 secured at each end in levers 69 loosely mounted upon the shaft 20. A spring 70 wrapped about the shaft 20 and connected at one end to a shaft 106 carried by the framework and at its other end to a stud 72 carried by one of the levers 69, serves to hold the roller 67 against the rolls 64. A rod 73 passes through openings 74 made in the levers 69 and has bearings at one end in the vertical wall 3 of the framework and at its other end in the vertical bracket 4. The opening 74 has a diameter considerably greater than the diameter of the shaft 73 and the said shaft is provided with eccentric portions 75 which lie within the openings 74. One end of the rod 73 protrudes beyond the vertical bracket 4 and is provided with a transverse pin 76 which provides a hand engaging means for turning the shaft counter-clockwise, which through the medium of the eccentric portions 75 will rock the levers 69 counter-clockwise and separate the rolls 67 and 64 so that the check strip 61 may be threaded therebetween. The means for feeding the check strip from the storage roll 62 upwardly between the rolls 64 and 67 will be hereafter described in the regular order in which this function occurs during the sequence of operations of the machine.

The detail strip (Fig. 4) is fed from a supply roll 77, rotatably mounted upon a shaft 78 secured at one end to the vertical wall 3 of the framework, forwardly and downwardly beneath a shield 79, hereafter to be described, over a roller 80 revolubly mounted upon a shaft 81 and thence carried vertically downwardly beneath a roller 82, revolubly mounted upon the shaft 49, and the brace rod 442, to a storage roll 83, revolubly mounted upon a shaft 84 secured at one end to the vertical wall 3 of the framework. The means for feeding the detail strip from the supply roll 77 to the storage roll 83 will be described later, in the sequence in which this function occurs during the operation of the machine.

From the foregoing description it will be seen that both the check strip and the detail strip are fed from their supply rolls, between the type wheels 19 and the platen 57 at which point they are opposite each other and substantially parallel.

Figure 7:
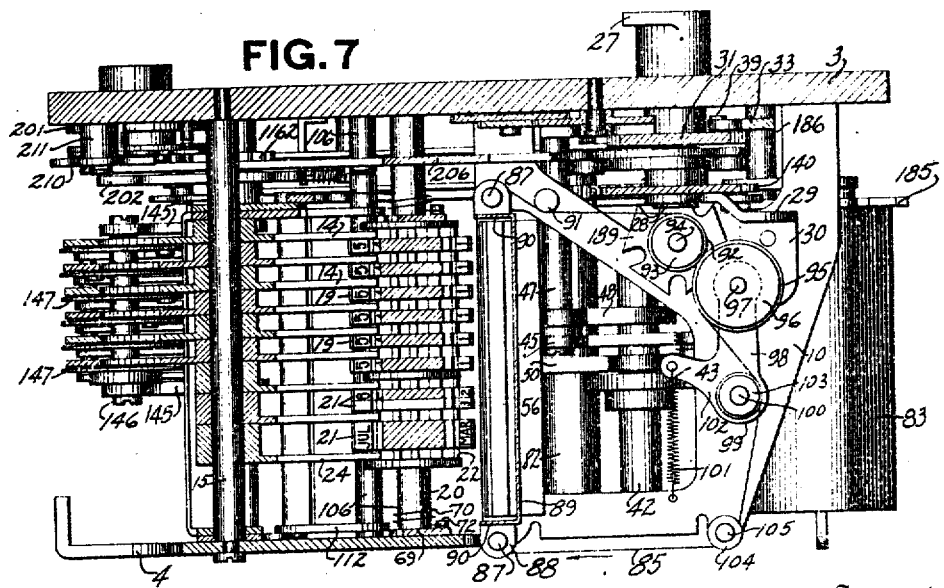
Fig. 7 is a horizontal sectional view taken on the line 7—7 of Figs. 2, 3, 4 and 5 and looking in the direction indicated by the arrows.

Between the said check strip and detail strip an endless ribbon 85 is interposed, referring to Figs. 4 and 7. The said ribbon 85 is moved in the direction of the arrow around vertically disposed rolls revolubly mounted upon vertical stud shafts 87 which are secured at their lower ends to the horizontal portion 10 of the bracket 9 and at their upper ends in horizontally extending lips 88 formed on a framework 89 which forms a brace between the two shafts. This framework also has vertically disposed ears 90 within which the ends of the shaft 81 are secured. The ribbon band 85 thence passes around a vertically extending stud 91 secured to the horizontal portion 10 of the framework and then between a felt ink roll 92 secured upon a hub 93 rotatably mounted upon a vertically extending stud shaft 94 secured in the bracket 10, and a felt ink roll 95 secured to a hub 96 rotatably mounted upon a stud shaft 97 secured to one arm 98 of a bell crank 99 pivotally mounted upon a vertically extending stud 100 secured to the bracket 10. A spring 101 is strained between the other arm 102 of the bell crank 99 and the bracket 10 providing means for normally holding the felt rolls 92 and 95 in a position to grip the ribbon band 85 between them. After passing between the rolls 92 and 95 the ribbon passes over a roller 103 loosely mounted upon the stud shaft 100 and thence around a roller 104 rotatably mounted upon a vertically extending stud 105 secured to the horizontally extending portion 10 of the bracket 9. Means, hereafter to be described, is provided for revolving the hub 93, which gripping the ribbon 85 between it and the ink roll 95, will serve to feed the ribbon over the various rollers before described, in the direction indicated by the arrow. The specific description of the ribbon feed will be set forth later in the sequence in which this function occurs during the operation of the machine. From the foregoing it will be seen that the impression movement of the platen 57 will squeeze the ink ribbon band 85, check strip and detail strip, between it and the type wheels 19 and cause an impression to be made both upon the check strip and the detail strip. The arrangement of the parts is such that one impression will be made upon the check strip and a reversed impression upon the detail strip and as a consequence the detail strip is made of transparent paper so that the impression may be read therethrough.

The manner of setting the type wheels, releasing the crank handle and cocking and releasing the platen for taking an impression has been described. These operations occur in the order mentioned but during the cocking of the platen, means is operated for locking and alining the type wheels so that they will not be disturbed by the force of the impression of the platen. This locking and alining means comprises, referring to Fig. 4, a plurality of pallets 105 pivotally mounted upon a shaft 106 secured at one end to the vertical wall 3 of the framework and at its other end in the vertical bracket 4. These pallets 105 are positioned on the shaft 106 by spacing collars (not shown) in a position whereby one nose 107 thereof coöperates with the gears 18 secured to the type wheels. A coiled spring 108 strained between the pallet and a brace rod 109 extending between the opposite walls of the framework provides means for normally holding the nose 107 in contact with the teeth of the gears 18. The said nose, however, is so shaped that when the gears 18 are revolved by the segments 14 in setting type each tooth of the wheel 18 will cam the nose 107 downwardly. The pallets 105 are also provided with a nose 110 which coöperates with a bail 111 carried by parallel arranged L shaped arms 112 loosely mounted upon the shaft 106 adjacent the inner sides of the walls 3 and 4 of the framework. Each of the arms 112 is provided with a stud 113 which coöperates with a nose 114 formed on an arm 115 one of which is secured to each of the arms 117, which arms are arranged parallel and are pivotally mounted upon the shaft 15 carrying at their outer ends a horizontally extending bail 118, the purpose of which will be hereinafter described.

Figure 5:
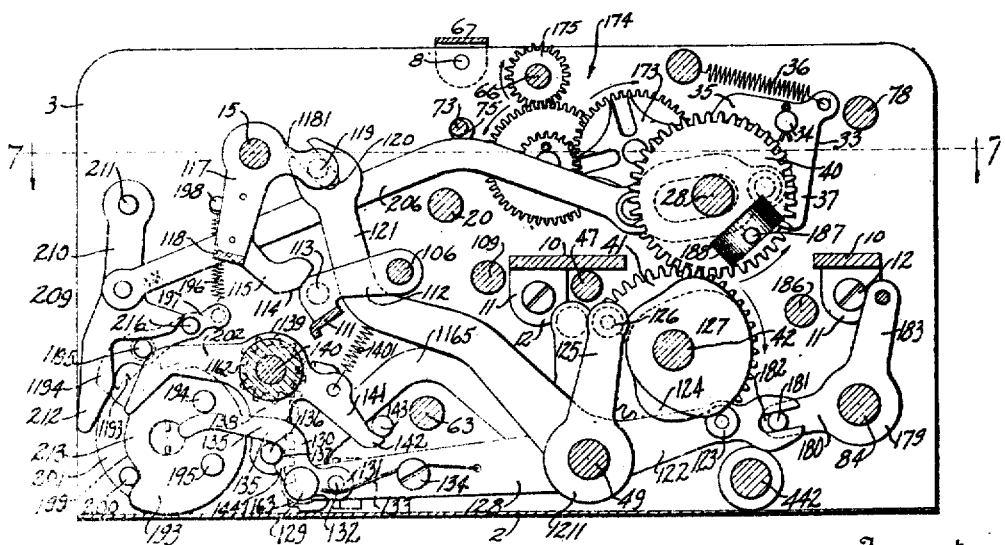
Fig. 5 is a vertical sectional view, parts shown in elevation, taken on the line 5—5 of Fig. 6 and looking in the direction of the arrows, said view showing the various driving gears and operating levers for the different elements of the register.

Referring now to Figs. 5 and 14, it will be seen that one of the arms 117 is of bell crank formation, having an arm 1181 carrying on its outer end a pin 119 which fits within a slot 120 formed in one end of a downwardly extending member 121 which is one arm of a three armed lever 1211 pivotally mounted upon the shaft 49. Another arm 122 of the lever 1211 extends rearwardly and carries adjacent its outer end an anti-friction roller 123 which runs upon the periphery of a cam 124, fast to the shaft 42. The third arm 125 of the lever extends upwardly substantially vertical and carries on its upper end an anti-friction roller 126 engaging with the periphery of a cam 127 fast upon the shaft 42. The cams 124 and 127 are secured to each other and together form what is known in the art as a "double plate cam." The arms 122 and 125 serve to hold the rollers carried by each arm in contact with its respective plate of the cam, each arm compensating for the movement of the other. Simultaneous with the cocking of the platen 57 through the rotation of the shaft 42 the cam 124 engaging the roller 123 rocks the arms 122 and 121 clockwise, which through the pin and slot connection with the lever 1181 rocks the arms 117 counter-clockwise engaging the noses 114 of the levers 115 with the pins 113 carried by the levers 112. A nose 114 upon engaging the pin 113 cams it downwardly, the bail 111 carried by the said levers engaging the noses 110 of the pallets 105 and forcing the other noses 107 of the said pallets into engagement with the teeth of the gears 18. Contact between the noses 114 and pins 113 prevents any movement of the pallets and consequently the gears 18 engaged thereby are locked against movement.

The shape of the cam plates 124 and 127 is such that the type wheels 18 are locked during the cocking of the platen 57 and are held locked until after the impression of the platen 57 against them.

During the time in which the platen 57 is cocked and the locking of the type wheels takes place, means is provided for throwing the totalizer into operative connection with the segments 14 so that the return movement of the said segments to home position will accumulate on the totalizer the amount set up on the type wheels. This means comprises (Figs. 5 and 17) a lever 128 loose upon the shaft 49 the outer end of which carries a stud shaft 129 to which is pivoted a bell crank lever 130, one arm 131 of the said bell crank being provided with a stud 132. A spring 133 wrapped about a pin 134 secured to the arm 128 has one end in engagement with the stud 132 and its other end secured to the lever 128 and provides means for normally holding the other arm 135 of the bell crank 130 in contact with a pin 136, the said pin resting within a notch 137 made in the said arm. The pin 136 is carried by a depending portion 138 of a framework 139 which is pivotally mounted upon a shaft 140 rotatably mounted at one end in the vertical wall 3 and at its other end in the vertical bracket 4 of the framework. The framework 139 is held in its normal position, illustrated in Fig. 5, by means of a coiled spring 1401 which is strained between a rearwardly extending arm 141 of the framework 139 and the shaft 106, said spring holding the outer end 142 of the lever 141 against a pin 143 secured to the vertical wall 3 of the framework. The lever 128 is provided with an arm 1281, referring to Fig. 17, which carries upon its outer end an anti-friction roller 1282 coöperating with a cam groove 1283 made in the gear 41, the rotation of the said shaft moving the lever 128 clockwise which will cause an extension 144, referring to Fig. 5, made on the arm 135 of the bell crank 130 to cam against the pin 136 and rock the framework 139 clockwise. The totalizer, hereafter to be described, is secured to the framework 139 and the rocking movement of the framework will cause a movement of the totalizer upwardly a distance sufficient to bring it into operative connection with the segments 14.

Figure 8:
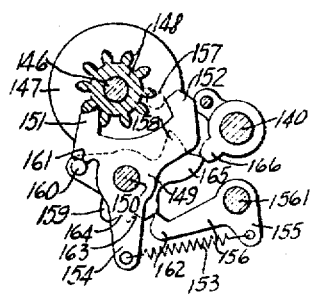
Fig. 8 is a detail view of the transfer mechanism for the totalizer.

The totalizer itself, referring particularly to Figs. 3, 4 and 8, comprises two substantially rectangular shaped frameworks 145, one of which is secured to the framework 139 so as to be actuated thereby, and the other totalizer framework rocks freely upon its pivotal support on the shaft 140. The accumulating elements, referring to Figs. 4 and 8, comprise thin disks 147 having gears 148 secured to one side thereof coöperating with each of which is an actuating detent 149 pivotally mounted upon a shaft 150 secured at each end to opposite corners of the frameworks 145. The said detents are shaped like the anchor of an escapement and are provided with two oppositely positioned tines 151 and 152, a spring 153 strained between a downwardly extending tail 154 integral with the detent 149 and the tail 155 of a pawl 156 pivoted upon a shaft 1561 secured to the frameworks 145, normally holding the tine 152 in engagement with the gear 148, as is shown in Fig. 4. The gears 148 are thrown in mesh with the teeth 16 formed on the segments 14, when the framework 139 is rocked, as previously described, and during the return movement of the segments to return the type wheels and operating levers 13 to normal position, the gears 148, there being one for each segment, will be rotated counter-clockwise. Immediately following the impression stroke of the platen 57 the cams 124 and 127 cause a counter-clockwise movement of the arm 121 so that the bail 118 is swung upwardly. The said bail is movable within cutout portions 1411, referring to Fig. 4, made in the segments 14 and the upward movement of the said bail brings it into engagement with faces 1611 of those segments which have been moved to set the type wheels, and returns them to their normal position. The return of the set segments 14 to their normal position rotates the gears 148 of the totalizer associated therewith so that the amount printed by the type wheels is accumulated on the totalizer. During this movement of the gears 148 each tine 152 will be depressed as it comes in contact with each tooth thereof and operates as a retaining pawl and since the said tine is in engagement with the gear 148 at the time when the said gear is disengaged from the teeth 16 of the segment it also serves as an aligner or retaining pawl for preventing retrograde movement of the gear 148. When one of the gears 148 has made a complete revolution, or in other words has passed from zero to 9, a pin 157 secured to the disk 147 on the side opposite to the gear 148 will come in contact with a nose 158 formed on a secondary detent 159 which is loosely mounted upon the shaft 150. The further movement of the gear 148, occasioned by its passing from 9 to 0, causes a clockwise movement of the secondary detent 159 which raises a pin 160 carried by the said detent into engagement with a face 161 formed on the actuating detent 149 directly beneath the tine 151 thereof. The pin 160 is held in this position by means of the nose 162 of the pawl 156 engaging a notch 163 made in the secondary detent 159. The nose 162 of the pawl 156 is normally held in engagement with a notch 164 made in the secondary detent 159, as is illustrated in Fig. 4, the movement of the said detent under the actuation of the pin 157 causing the displacement of the nose 162 from the notch 164 and its lodgment within the notch 163, as previously described. When the secondary detent 159 has been rocked so that the pin 160 lies against the actuating face 161 of the actuating detent 149 a projection 165 formed integral with the nose 158 of the secondary detent 159 will be placed in a position to be engaged by a cam 166, referring to Fig. 8, fast upon the shaft 140. It is to be understood that there are a plurality of cams 166 mounted upon the shaft 140 one cam coöperating with each of the projections 165 of the secondary detents and these cams are arranged spirally about the said shaft as shown in Fig. 4. After the amount set up on the type wheels has been transferred to the gears 148 by the return of the segments 14 to normal position and the various secondary detents 159 have been set, as previously described, the gears 148 are disengaged from the teeth 16 of the segments 14. The disengagement of the gears 148 is accomplished by the cam groove 1283 in the gear 41 and the roller 1282 on the drum 1281 which, after the return of the segments 14 to normal position causes a counter-clockwise movement of the lever 128 which returns the bell crank 130 to its normal position permitting the pin 136 to be rocked within the recess 137 formed within the bell crank 130 by means of the spring 1401. The spring 1401 in returning the pin 136 to its normal position rocks the frame 139 counter-clockwise and this frame being connected to one of the counter frames 145 will cause the said frame also to be rocked counter-clockwise and thereby disengage the gears 148 from the teeth 16 of the segments. After the disengagement of the gears 148 from the gear teeth 16 of the segments 14 means is provided for giving the shaft 140 a revolution so that the cams 166, spirally mounted thereon, will in succession come in contact with the projections 165 of the secondary actuating detents 159 which have been set in the path thereof. Contact between a cam 166 and a projection 165 will cause a clockwise movement of the secondary detent 159, which in its movement, through the engagement of the pin 160 with the actuating face 161 of the actuating detent 159, will force the tine 151 thereof into contact with the teeth of the gear 148 and move the said gear forward one-half a tooth space. During this operation the nose 162 of the pawl 156 has been dislodged from the notch 163. As a consequence, as soon as the cam 166 passes beyond the projection 165, the tail 154 of the actuating detent 149 will be rocked counter-clockwise under influence of the spring 153. This movement of the detent will engage the tine 152 thereof with the gear 148 and move the said gear another one-half tooth space and thus effecting a transfer. It is to be understood that the secondary detent 159 and detent 149 lie on opposite sides of the disk 147 so that the passage of one gear 148 from 9 to 0 sets the secondary detent 159 associated therewith in such a position that the pin 160 will be brought in contact with the actuating face 161 of the detent 149 of the next higher order so that a subsequent actuation of a cam 166 will cause a movement of the detent 149 of the next higher order to move its associated gear 148 to effect the transfer as previously explained.

Figure 9:
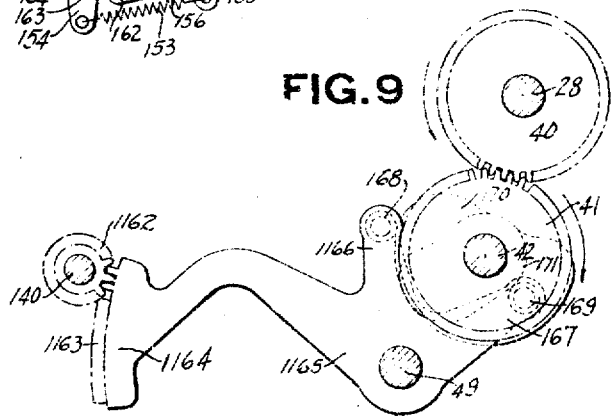
Fig. 9 is a detail view of the driving elements for the transfer mechanism.

The means for rotating the shaft 140 to effect the transfer operation, as above described, comprises, referring to Fig. 9, a pinion 1162 fast to one end of the shaft 140 which meshes with the teeth 1163 of a segment 1164 which is formed on one end of a lever 1165 pivotally mounted upon the shaft 49. Said lever 1165 is provided with a forked end having two arms 1166 and 167 carrying on their outer ends anti-friction rollers 168 and 169 which coöperate with plates 170 and 171 respectively of a double plate cam fast upon the shaft 42. After the gears 148 have been set by the segments and thrown out of mesh therefrom the segment 1164 is moved clockwise through the medium of the cam plates 170 and 171 so that the shaft 140 is given a revolution which engages the cams 166 with the extensions 165 of the secondary detents for effecting the transfer. The shape of the cam plates 170 and 171 are such that after the shaft 140 has made approximately three-fourths of a revolution in the direction indicated by the arrow, Fig. 9, the segment 1164 is rocked counter-clockwise so that the shaft 140 receives a rotation in the reverse direction. This reverse rotation of the shaft 140 brings the cams 166 into engagement with the lower side of the extensions 165 of the secondary detents 159 and returns them to their normal position which is shown in Fig. 4. During the movement of a detent 159 to normal position the nose 162 of the pawl 156 is lodged within the notch 164 made in the said secondary detent and provides means for holding it in its normal position.

During the time in which the shaft 140 is being revolved to effect the transfer operations of the counter, as above explained, the feed of the check strip, detail strip and ink ribbon takes place.

Figure 10:
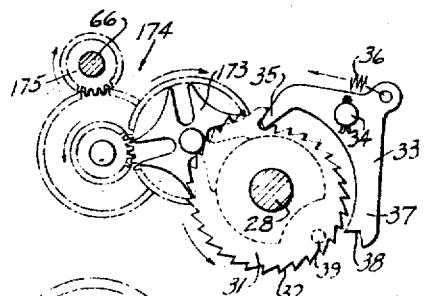
Fig. 10 is a detail view of the full stroke mechanism and driving means for the paper feed.

At the beginning of the last half revolution of the crank handle 27 the pin 39, referring to Fig. 10, carried by the disk 31 engages the star wheel 173 of a Geneva movement 174 which through the usual gear train revolves a gear 175 one complete revolution during the third quarter of the revolution of the crank handle 27 and the shaft 28 which is driven thereby. The gear 175 is fast upon a shaft 66 which carries the serrated rolls 64 which coöperate with the resilient roll 67 to draw the check strip from its storage roll and extrude it through an opening 1174 made in the cabinet or casing 1. An electrotype 1175 is secured upon the sleeve 65, referring to Fig. 4, which is fast upon the shaft 66 so that during the extrusion of the check strip an impression is made by the electrotype upon the strip just above the impression made by the type wheels 19 and platen 57 so that the extruded portion of the strip is printed in the manner illustrated in Fig. 11. The edge of the brace rod 6 is formed with a knife edge 177 which lies directly beneath the rear edge of the opening 1174 and provides means for severing the printed portion of the check strip from the remainder of the strip so that the printed portion when severed resembles a check. The electrotype 1175, referring to Fig. 4, is engaged by an ink roll 176 pressed against the electro by means of a spring 1177. The said ink roll is mounted upon a shaft 178 arranged directly above the shield 79 so that the detail strip which passes beneath the said shield will not come in contact with the ink roll 176.

The means for feeding the detail strip comprises a bell crank lever 179, referring to Figs. 4 and 5, pivotally mounted upon the shaft 84, one arm 180 of the bell crank being provided with a pin 181 fitting within a slot 182 formed in the extreme end of the arm 122. The other arm 183 of the said bell crank carries a spring actuated pawl 184 on its upper end which coöperates with the teeth of a ratchet 185 made fast upon the storage roll 83. A spring pressed retaining pawl 1185 pivoted upon a stud 186 secured to the vertical wall 3 of the framework also coöperates with the ratchet wheel 185 and provides means for preventing any retrograde movement thereof. The movement of the arm 122 under the control of the cam plates 124 and 127 to rock the bail 118 for returning the segments to normal position, as heretofore described, through its connection with the arm 180 of the bell crank 179 moves the pawl 184 carried thereby rearwardly one tooth space so that the said pawl drops within the next succeeding tooth of the ratchet 185. During the return movement of the bail 118 to its normal position the pawl 184 carried by the lever 183 is moved counter-clockwise, rotating the ratchet 185 one tooth space and the feed of the detail strip from the supply roll 78 to the storage roll 83 accomplished.

Simultaneous with the return of the bail 118 to its lowered normal position and simultaneous with the feeding movement of the pawl 184 the mechanism for feeding the ribbon is operated. This means, referring to Figs. 5 and 7, comprises a pin 187 secured in the bottom of an arcular shaped recess 188 made in the face of the driving gear 40 adjacent the ribbon band 85. This pin coöperates with a star wheel 189 fast upon the shaft 94 and during the last one-fourth turn of the crank handle the pin 187 engages the star wheel 189 and moves it one-fourth of a revolution thereby rotating the hub 93 which feeds the ink band 85 between the felt ink roll 92 carried by the said hub and the felt ink roll 95 carried by the spring pressed hub 96. In this way the ink band 85 is constantly reinked by its passage between the ink rolls 92 and 95.

The functions of the various elements of the register during the adding or accumulating operation thereof is as follows: The segments 14 are first set by means of the handles 13 to positions opposite the integers inscribed on the casing which together represent the amount desired to be accumulated. This setting movement of the segments rotates the type wheels geared thereto a distance sufficient to set the wheels commensurate therewith. The operating handle is then moved a slight distance counter-clockwise which releases the lock therefor and also throws in the full stroke mechanism. The first initial movement of the crank handle causes the bail 118 to move counter-clockwise and lock the spring actuated alining pallets 105 against the type wheels so that they are prevented from movement during the subsequent impression to be taken therefrom. The further movement of the crank handle cocks and releases the platen 57 through the medium of the levers 46, 53 and cam 43 so that an impression is taken from the type wheels upon the check strip and detail strip. Simultaneous with the locking of the alining pallets the counter frameworks 145 are rocked upwardly a distance sufficient to engage the gears 148 with the segments 14. The bail 118 is then rotated clockwise which returns the segments 14 to their normal position thereby setting the gears 148 commensurate with the amount set upon the type wheels 19, the counter framework 145 being rocked counter-clockwise at the conclusion of the upward movement of the bail 118 and disengaging the gears 148 from the segments. The further actuation of the crank handle through a Geneva movement feeds the check strip and impresses the electrotype thereupon. Simultaneous with the feeding movement of the check strip the shaft 140 is rotated which engages the cams 166 carried thereby with the secondary detents 159 and thereby performing the transfer operation of the counter. The last one-fourth movement of the crank handle returns the bail 118 to its normal position and simultaneously therewith feeds the detail strip and ribbon band 85.

The means for taking the total, broadly described, comprises a key actuated element which is designed to rock the gears 148 into engagement with the segments before the crank handle is operated. The segments are then moved as far as they will go which sets the totalizer to zero and transfers the amount accumulated thereon upon the type wheels. The crank handle is then turned and the impression taken in the usual manner, the first fraction of movement of the crank handle throwing out the totalizer.

The total taking mechanism specifically described comprises, referring to Figs. 15, 16 and 17, a key 190 which is designed to fit within a lock 191 carried by the vertical wall 3 of the framework. Rotatably mounted within the casing of the lock 191 is a hub 192 which carries on its inner end a disk 193 having a short lug 194 and a long lug 195 extending outwardly therefrom. A portion of the periphery of the disk 193 is provided with ratchet teeth 1193 which coöperate with a pawl 1194 pivotally mounted upon a stud 1195 and held in engagement with the said ratchet teeth by means of a spring 196 strained between the tail 197 of the pawl and a stud 198 carried by the vertical wall 3 of the framework. The disk 193 is provided with a cut-away portion 199 to receive a pin 200 carried by a disk 201 secured to the lock casing 191, the said cut-away portion and pin limiting the movement of the disk 193 in each direction, as will hereafter be described. The hub 192 is provided with a recess 203 to receive the ends of the key 190. Referring particularly to Fig. 5 it will be seen that in their normal position the short lug 194 rests beneath a forwardly extending hook shaped arm 202 integral with the totalizer rocking framework 139 while the long lug 195 is positioned beneath the arm 135 of the bell crank 130, which as previously described, normally engages the pin 136 and rocks the totalizer framework 139 for engaging the totalizer gears 148 with the gear teeth 16 of the segments. In the total taking operation the key 190 is inserted in the lock casing 191 until its inner end fits within the recess 203 made in the hub 192. The key is then turned counter-clockwise which rotates the disk 193 until one end of the cut-out portion 199 thereof engages the pin 200 as is shown in Fig. 17. The rotation of the disk 193 lodges the pawl 1194 in the last one of the teeth 1193 made on the periphery of the disk 193. Attention is called to the fact that the teeth 1193 and the pawl 1194 provide a full stroke mechanism for the disk 193 which prevents its reversal after its initial movement. The disk 193 upon being turned will lock the key 190 within the lock casing 191 so that it cannot be removed. The rotation of the disk 193 brings the short stud 194 carried thereby into engagement with the hook shaped arm 202 and, during the travel of the said stud, lifts the arm 202 rocking the frame 139 and the totalizer carried thereby upwardly a distance sufficient to engage the gears 148 with the teeth 16 of the segments 14. Simultaneous with the engagement between the stud 194 and the arm 202 the long stud 195 engages the arm 135 of the bell crank 130 and raises this arm a distance sufficient to break its operative connection with the pin 136, so that the movement of the lever 128, hereafter to be described, in its regular sequence of operation will not effect a movement of the totalizer framework 139 in either direction. The hub portion of the arm 139 is cut away at the point 204 to permit the upward movement of the arm 135. From the foregoing it will be seen that the operation of the key 190 both locks the key and prevents its withdrawal, rocks the gears 148 of the totalizer into engagement with the teeth 16 of the segments and also displaces or renders inoperative the driving connection between the lever 128 and the totalizer rocking framework 139. After the totalizer has been thrown into operative relation with the segments the said segments are moved forwardly as far as they will go. This forward movement of the segments, referring to Fig. 4, will rotate the gears 148 until the pins 157 carried by the disk 147 engage the upper side of the projections 158 carried by the secondary detents 159. This contact prevents further rotation of the gears 148 and sets the said gears to zero, during which return to zero operation, the type wheels 19 are set commensurate with the amount accumulated upon the gears 148 as is readily understood. The crank handle is then revolved which cocks and releases the platen to take an impression in a manner similar to its operation during the accumulating functions of the register. Due to the direction in which the detail strip is fed, the figures representing the total amount are printed above the individual amounts instead of below as is usual (Fig. 12). Immediately following the impression of the platen 57 an open cam 205 fast upon the shaft 28 moves a link 206, referring to Fig. 17, to the right. This link 206 is provided with an elongated slot 207 to receive the shaft 28 and two anti-friction rollers 208 which engage opposite sides of the open cam 205. The forward end of the link 206 is pivoted at 209 to a lever 210 pivotally mounted upon a stud 211 carried by the vertical wall 3 of the framework. The lever 210 is provided with a vertically extending portion 212 having a nose 213 adapted to coöperate with the short stud 194 carried by the disk 193, and a rearwardly extending tail piece 214 which has a nose 215 adapted to coöperate with a pin 216 carried by the tail 197 of the pawl 1194. As previously stated immediately following the impression of the platen 57 to print the total the link 206 through the medium of the cam 205 is moved to the right. The movement of the link 206 causes a counter-clockwise rocking of the lever 210 which engages the nose 215 formed on the tail 214 of the said lever with the pin 216 of the pawl 1194 and cams this pin downwardly a distance sufficient to disengage the nose of the pawl 1194 from the teeth 1193 of the disk 193. The further counter-clockwise movement of the lever 210 engages the nose 213 formed on the downwardly extending portion 212 with the short stud 194 carried by the disk 193 and returns this stud to its normal position, as illustrated in Fig. 5. The restoring movement of the disk 193 permits the arm 202 of the totalizer rocking framework 139 to drop and thereby disengaging the gears 148 of the totalizer from the teeth 16 of the segments 14. During the end of the movement of the crank handle 27 the link 206 is moved back to its normal position as illustrated in Fig. 5. During adding or accumulating operations of the register, the parts are in the position as illustrated in Fig. 5 and the pin 194 is so far removed from the nose 213 of the lever 210 that the rocking of the said lever does not engage the said pin and during the accumulating operations of the register performs no function therein but merely rocks idly, the said lever only performing a useful function during the total taking operation.

The functions of the various elements during the total taking operation of the register are as follows: The key 190 is first inserted in the lock casing 191 and turned clockwise. This movement of the key engages the gears 148 of the totalizer with the teeth 16 of the segments 14 and at the same time locks the key so that it may not be removed until the completion of the total taking operation. Also due to the full stroke mechanism coöperating with the key, it is prevented from removal after it has once been turned any distance whatever until the crank handle 27 has been revolved to release it. After the gears 148 have been engaged with the teeth 16 of the segments 14 the said segments are moved forwardly as far as they will go, their movement being limited by the engagement of the pins 157 carried by the disks 157 with the secondary detents 159, at which time the gears 148 are returned to their normal position and the type wheels 19 set commensurate with the amount accumulated on the totalizer. The crank handle 27 is then rotated counter-clockwise to release the latch therefor, the release of the latch throwing in the full stroke mechanism. The crank handle is then rotated clockwise. The first movement of the handle causes a cocking and releasing of the platen to take an impression and immediately following the release of the platen the link 206 is moved which throws the totalizer out of operative connection with the segments and unlocks the key 190. The further operation of the crank handle causes a feeding and extrusion of the check strip and a feeding of the detail strip and ribbon in a manner similar to the functions of these elements during the accumulating operations.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of differentially manipulative amount controlling devices, accounting elements, key actuated means for operatively connecting said accounting elements and amount controlling devices, a key for actuating the key actuated means but normally removable therefrom, and means for preventing removal of the said key until the said elements have been coöperatively actuated.

2. In a machine of the class described, the combination of manipulative amount controlling devices, accounting elements, key actuated means for operatively connecting said controlling devices and accounting elements for taking a total, a key for actuating the key actuated means but normally removable therefrom, and means for preventing removal of the key until after the total taking operation.

3. In a machine of the class described, the combination of manipulative amount controlling devices, accounting elements, key actuated means for operatively connecting said controlling devices and accounting elements for taking a total, a key for actuating the key actuated means but normally removable therefrom, and means for preventing a removal of the key until after the total taking operation, said means comprising a full stroke mechanism for controlling the movement of the key actuated means.

4. In a machine of the class described, the combination of differentially manipulative amount controlling devices, accounting elements, key actuated means for operatively connecting said accounting elements and amount controlling devices, a key for actuating the key actuated means but normally removable therefrom, said means comprising a rotatable member, a projection thereupon adapted to engage the accounting elements for operatively connecting them with the amount controlling devices, and a full stroke mechanism coöperating with said rotatable member providing means whereby the key is prevented from removal until the actuation of the accounting devices by the amount controlling devices is completed.

5. In a machine of the class described, the combination of differentially manipulative amount controlling devices, accounting elements, key actuated means for operatively connecting said accounting elements and amount controlling devices, a key for actuating the key actuated means but normally removable therefrom, said means comprising a rotatable member adapted to engage the accounting elements for operatively connecting them with the amount controlling devices, and a full stroke mechanism coöperating with said rotatable member providing means whereby the key is prevented from removal until the actuation of the accounting devices by the amount controlling devices is completed.

6. In a machine of the class described, the combination of differentially manipulative amount controlling devices, accounting elements, key actuated means for operatively connecting said accounting elements and amount controlling devices, a key for actuating the key actuated means but normally removable therefrom, said means comprising a rotatable member, and a full stroke mechanism coöperating with said rotatable member providing means whereby the key is prevented from removal until the actuation of the accounting devices by the amount controlling devices is completed.

7. In a machine of the class described, the combination of differentially manipulative amount controlling devices, accounting elements and a printing mechanism, key actuated means for operatively connecting said accounting elements and amount controlling devices, a key for actuating the key actuated means but normally removable therefrom, said means comprising a rotatable member, and a full stroke mechanism coöperating with said rotatable member providing means whereby the key is prevented from removal until the actuation of the accounting devices by the amount controlling devices is completed, and means coöperating with said printing mechanism for actuating the rotatable member for releasing the key.

8. In a machine of the class described, the combination of differentially manipulative amount controlling devices, accounting elements, printing elements, key actuated means for operatively connecting said controlling devices and accounting elements, a key for actuating the key actuated means but normally removable therefrom, means for locking the key actuated means after its actuation for operatively connecting the amount controlling devices and the accounting elements, and means coöperating with the printing elements for releasing the said key actuated means.

9. In a machine of the class described, the combination of differentially manipulative amount controlling devices, accounting elements, printing mechanism, key actuated means for operatively connecting the amount controlling devices and the accounting elements, a key for actuating the key actuated means but normally removable therefrom, and means for preventing the removal of the key until after the operation of the printing mechanism.

10. In a machine of the class described, the combination of differentially manipulative amount controlling devices, accounting elements, a printing mechanism, key actuated means for operatively connecting the amount controlling devices and the accounting elements for printing a total, a key for actuating the key actuated means but normally removable therefrom, and means for preventing the removal of the key until after the total printing operation.

11. In a machine of the class described, the combination of differentially manipulative amount controlling devices, accounting elements, a printing mechanism, key actuated means for operatively connecting said controlling devices and accounting elements, a key for actuating the key actuated means but normally removable therefrom, means for preventing the removal of the key after its actuation for operatively connecting the amount controlling devices and accounting elements, and means coöperating with the printing mechanism for releasing the key so that it may be removed.

12. In a machine of the class described, the combination of differentially manipulative amount controlling devices, accounting elements, a printing mechanism, key actuated means for operatively connecting said controlling devices and accounting elements, a key for actuating the key actuated means but normally removable therefrom, said means comprising a rotatable member, means coöperating with said rotatable member for locking the key actuated means during a movement of the rotatable member in one direction, and means coöperating with said printing mechanism for moving the rotatable member in the opposite direction and releasing the said key actuated means.

13. In a machine of the class described, the combination of differentially manipulative amount controlling devices, accounting elements, a printing mechanism, a rotatable member, means carried thereby for engaging the accounting elements and operatively connecting them with the amount controlling devices, said rotatable member being key actuated, a key for actuating the key actuated means but normally removable therefrom, a full stroke mechanism coöperating with said rotatable member for locking the key actuated means during its movement in one direction, and means coöperating with said printing mechanism for moving the rotatable member in the opposite direction and releasing the said key actuated means.

14. In a machine of the class described, the combination of differentially manipulative amount controlling devices, accounting elements, a rotatable member, a projection carried thereby, key actuated means for rotating said rotatable member and moving the projection carried thereby into contact with the accounting elements for operatively connecting them with the amount controlling devices, a key for actuating the key actuated means but normally removable therefrom, a full stroke mechanism coöperating with said rotatable member for locking the key actuated means during the movement of said rotatable member in one direction, and means coöperating with the printing mechanism for moving the rotatable member in the opposite direction and thereby disengaging the accounting elements from the amount controlling the devices and also releasing the key actuated means.

15. In a machine of the class described, the combination of differentially manipulative amount controlling devices, accounting elements, a printing mechanism, a rotatable member, a projection carried thereby, key actuated means for rotating said rotatable member and moving the projection carried thereby in contact with the accounting elements for operatively connecting them with the amount controlling devices, a key for actuating the key actuated means but normally removable therefrom, a full stroke mechanism coöperating with said rotatable member for locking the key actuated means during the movement of said rotatable member in one direction, and means coöperating with the printing mechanism for moving the rotatable member in the opposite direction both for disengaging the accounting elements from the amount controlling devices and also releasing the key actuated means, said moving means comprising a rocking element adapted to engage the projection carried by the rotatable member.

16. In a machine of the class described, the combination of differentially manipulative amount controlling devices, accounting elements operatively associated therewith, a liner for said accounting elements, a bail for returning said amount controlling devices to their normal position, and means for moving the bail in one direction to lock the liner and in the opposite direction for returning the amount controlling devices to their normal position.

17. In a machine of the class described, the combination of differentially manipulative amount controlling devices, a totalizer normally disengaged from said devices, means for engaging the totalizer with the amount controlling devices for accumulating thereon the amounts set by said devices, and key actuated means for engaging said totalizer with the amount controlling devices and rendering the first mentioned totalizer engaging means inoperative.

18. In a machine of the class described, the combination of differentially manipulative amount controlling devices, a totalizer normally disengaged from said devices, means for engaging the totalizer with the amount controlling devices for accumulating thereon the amounts set by said devices, key actuated means for engaging said totalizer with the amount controlling devices and rendering the first mentioned totalizer engaging means inoperative, a key for actuating the key actuated means but normally removable therefrom, and a full stroke mechanism coöperating with said key actuated means for preventing the removal of the key after its actuation for engaging the totalizer with the amount controlling devices.

19. In a machine of the class described, the combination of differentially manipulative amount controlling devices, a totalizer, means for engaging the totalizer with the amount controlling devices for accumulating thereon the amounts set by said devices, a printing mechanism, key actuated means for engaging said totalizer with the amount controlling devices and rendering the first mentioned totalizer engaging means inoperative, a key for actuating the key actuated means but normally removable therefrom, a full stroke mechanism coöperating with said key actuated means for preventing the removal of the key after its actuation for engaging the totalizer with the amount controlling devices, and means coöperating with said printing mechanism for restoring the first mentioned totalizer engaging means to its normal position and releasing the key.

20. In a machine of the class described, the combination of differentially manipulative amount controlling devices, a totalizer, means for engaging the totalizer with the amount controlling devices for accumulating thereon the amounts set by said devices, a printing mechanism, key actuated means for engaging said totalizer with the amount controlling devices and rendering the first mentioned totalizer engaging means inoperative, a key for actuating the key actuated means but normally removable therefrom, a full stroke mechanism coöperating with said key actuated means for preventing the removal of the key after its actu tion for engaging the totalizer with the amount controlling devices, and means coöperating with said printing mechanism for releasing the first mentioned totalizer engaging means and releasing the full stroke mechanism.

21. In a machine of the class described, the combination of manipulative amount controlling devices, a totalizer normally disengaged from said devices, means for engaging the totalizer with the amount controlling devices for accumulating thereon the amounts set by said devices, key actuated means for engaging the totalizer with the amount controlling devices for taking a total from the totalizer and simultaneously rendering the first mentioned totalizer engaging means inoperative.

22. In a machine of the class described, the combination of manipulative amount controlling devices, a totalizer normally disengaged from said devices, means for engaging the totalizer with the amount controlling devices for accumulating thereon the amounts set by said devices, and key actuated means for engaging the totalizer with the amount controlling devices for taking a total from the totalizer and simultaneously rendering the first mentioned totalizer engaging means inoperative, said means comprising a rotatable member having projections thereon for engaging the totalizer and the first mentioned engaging means.

23. In a machine of the class described, the combination of manipulative amount controlling devices, a totalizer, a member for moving the totalizer into engagement with the amount controlling devices for accumulating thereon amounts set by said devices, and key actuated means for moving the totalizer into engagement with the amount controlling devices for taking a total from the said totalizer, said means comprising a rotatable member having abutments thereon, one of said abutments adapted to move the totalizer into engagement with the amount controlling devices, another of said abutments adapted to engage the totalizer engaging member and render the said member inoperative.

24. In a machine of the class described, the combination of manipulative amount controlling devices, accounting elements, a member for moving the accounting elements into engagement with the amount controlling devices for accumulating thereon amounts set by said devices, key actuated means for moving the accounting elements into engagement with the amount controlling devices for taking a total from the said accounting elements, said means comprising a rotatable member having abutments thereon, one of said abutments adapted to move the accounting elements into engagement with the amount controlling devices, another of said abutments adapted to engage the accounting elements engaging member and render the said member inoperative, and a full stroke mechanism coöperating with said rotatable member.

25. In a machine of the class described, the combination of manipulative amount controlling devices, a totalizer and printing mechanism, a member for engaging the totalizer with the amount controlling devices for accumulating thereon the amounts set by said devices, key actuated means for engaging the counter with the amount controlling devices for taking a total from the said totalizer, said means comprising a rotatable member, projections carried by the said member, one of said projections adapted to engage the totalizer engaging member and render it inoperative, another of said projections adapted to engage the totalizer and move it into operative relation with said amount controlling devices, and means coöperating with said printing mechanism for returning the rotatable member to its normal position.

26. In a machine of the class described, the combination of manipulative amount controlling devices, a totalizer, a printing mechanism, a linked lever providing means for moving the totalizer into operative relation with the amount controlling devices for accumulating thereon the amounts set by said devices, key actuated means for moving the totalizer into operative connection with the amount controlling devices for taking a total from the said totalizer, said means comprising a rotatable member having projections thereon, one of said projections adapted during the rotation of said member to engage one of the links of the totalizer engaging member and render the said member inoperative, another of said projections adapted to move the totalizer into operative relation with the amount controlling devices, and means coöperating with said printing mechanism for rotating the rotatable member in the opposite direction and restoring the totalizer and link of the totalizer operating lever to its normal position.

27. In a machine of the class described, the combination of manipulative amount controlling devices, a totalizer, a printing mechanism, a member for moving the totalizer into operative relation with the amount controlling devices for accumulating thereon the amounts set by said devices, key actuated means for moving the totalizer into operative connection with the amount controlling devices for taking a total from the said totalizer, said means comprising a member rotatable by the key in one direction, a key for actuating the key actuating means but normally removable therefrom, a full stroke mechanism coöperating therewith providing means for preventing a removal of the key, and means coöperating with the printing mechanism for releasing the full stroke mechanism and rotating the totalizer in the reverse direction.

28. In a machine of the class described, the combination of manipulative amount controlling devices, accounting elements, printing mechanism, key actuated means for operatively connecting said accounting elements with the amount controlling devices, a key for actuating the key actuated means but normally removable therefrom, a full stroke mechanism coöperating with said key actuated means, and means coöperating with said printing mechanism for releasing the full stroke mechanism and disengaging the accounting elements from the amount controlling devices.

29. In a machine of the class described, the combination of differentially manipulative amount controlling devices, accounting elements, a printing mechanism, a rotatable member having a projection for engaging the accounting elements during its rotation and moving the said accounting elements into operative relation with the amount controlling devices, said rotatable member having teeth upon its periphery, a spring pressed pawl coöperating therewith, and a member coöperating with the printing mechanism for releasing the pawl and engaging the projection of the rotatable member for rotating the said member to its normal position.

30. In a machine of the class described, the combination of differentially manipulative amount controlling devices, accounting elements, printing mechanism, a rotatable member having a projection for engaging the accounting elements and moving them into operatable relation with said amount controlling devices for taking a total of the amounts accumulated on the accounting elements, key actuated means for rotating the said member, a key for actuating the key actuated means but normally removable therefrom, a full stroke mechanism coöperating with said rotatable member providing means for locking said key, and a member coöperating with the printing mechanism for releasing the full stroke mechanism and returning the rotatable member to its normal position thereby releasing the key and disengaging the counter from the amount controlling devices.

31. In a machine of the class described, the combination of differentially manipulative amount controlling devices, accounting elements, printing mechanism, operating means therefor, key actuated means for engaging the accounting elements with the manipulative amount controlling devices for taking a total from the said accounting elements, a key for actuating the key actuated means but normally removable therefrom, a full stroke mechanism coöperating with said key actuated means for preventing a removal of the key after an actuation of the said means, and means coöperating with the actuating means for the printing mechanism for releasing the full stroke mechanism and disengaging the accounting elements from their operative connection with the amount controlling devices.

32. In a machine of the class described, the combination of differentially manipulative amount controlling devices, accounting elements, an impression mechanism, key actuated means for engaging the accounting elements with the amount controlling devices for taking a total from the said accounting elements, a key for actuating the key actuated means but normally removable therefrom, means coöperating with the key actuated means for preventing a removal of the key after an actuation of the said means, and a release mechanism actuated by the operation of the impression mechanism for releasing the said key.

33. In a machine of the class described, the combination of differentially manipulative amount controlling devices, accounting elements, an impression mechanism, key actuated means for taking a total from the accumulating elements, a key actuating the key actuated means but normally removable therefrom, means coöperating with the key actuated means for preventing the removal of the key after an actuation of the said means, and a release device operated by the impression mechanism for releasing the key.

34. In a machine of the class described, the combination of a main operating mechanism, differentially manipulative amount controlling devices, accounting elements, key actuated means for operatively connecting said accounting elements and amount controlling devices, a key for actuating the key actuated means but normally removable therefrom, and means for preventing removal of the key until the main operating mechanism has been operated.

35. In a machine of the class described, the combination of a main operating mechanism, differentially manipulative amount controlling devices, accounting elements, key actuated means for operatively connecting said accounting elements and amount controlling devices for taking a total, a key for actuating the key actuated means but normally removable therefrom, and means for preventing removal of the key until the main operating mechanism has been operated for taking said total.

36. In a machine of the class described, the combination of a main operating mechanism, differentially manipulative amount controlling devices, a totalizer normally disengaged from said devices, key actuated means for operatively connecting said controlling devices and totalizer for taking a total, a key for actuating the key actuated means but normally removable therefrom, and means for preventing removal of the key until after the total taking operation, said means comprising a full stroke device rendered effective by actuation of the key and released by the operation of the main operating mechanism.

37. In a machine of the class described, the combination of a main operating mechanism, differentially manipulative amount controlling devices, accounting elements, printing mechanism, key actuated means for operatively connecting the amount controlling devices and the accounting elements, a key for actuating the key actuated means but normally removable therefrom, and means for preventing the removal of the key until after an operation of the printing mechanism and main operating mechanism.

38. In a machine of the class described, the combination of a main operating mechanism, differentially manipulative amount controlling devices, accounting elements, printing mechanism, key actuated means for operatively connecting the amount controlling devices and the accounting elements, a key for actuating the key actuated means but normally removable therefrom, and means for preventing the removal of the key until the printing mechanism has been operated by the main operating mechanism.

39. In a machine of the class described, the combination of a main operating mechanism, differentially manipulative amount controlling devices, a totalizer normally disengaged from said devices, means operated by the main operating mechanism for engaging the totalizer with the amount controlling devices for accumulating thereon the amounts set by said devices, key actuating means for engaging said totalizer with the amount controlling devices and rendering the first mentioned totalizer engaging means inoperative, means operated by the main operating mechanism for releasing the last mentioned totalizer engaging means to restore the first mentioned totalizer engaging means to normal position.

40. In a machine of the class described, the combination of a main operating mechanism, differentially manipulative amount controlling devices, accounting elements operatively associated therewith, a liner for said accounting elements, a bail for returning said amount controlling devices to their normal position, and means operated by the main operating mechanism for moving the bail in one direction to lock the liner and in the opposite direction to restore the amount controlling devices to their normal position.

In testimony whereof I affix my signature.

FREDERICK L. FULLER.